US012515152B2

(12) United States Patent
Abdalla et al.

(10) Patent No.: US 12,515,152 B2
(45) Date of Patent: Jan. 6, 2026

(54) FILTER ASSEMBLY INCLUDING SEPARATE FUEL AND WATER FLOW PATHS

(71) Applicant: Cummins Filtration Inc., Nashville, TN (US)

(72) Inventors: Wassem Abdalla, Fishers, IN (US); Jayant Singh, Pune (IN); Sagar Padale, Pune (IN); Ujjwala Lagad, Pune (IN)

(73) Assignee: Cummins Filtration Inc., Nashile, TN (US)

(*) Notice: Subject to any disclaimer, the term of this patent is extended or adjusted under 35 U.S.C. 154(b) by 370 days.

(21) Appl. No.: 18/021,332

(22) PCT Filed: Aug. 16, 2021

(86) PCT No.: PCT/US2021/046134
§ 371 (c)(1),
(2) Date: Feb. 14, 2023

(87) PCT Pub. No.: WO2022/040083
PCT Pub. Date: Feb. 24, 2022

(65) Prior Publication Data
US 2024/0001267 A1    Jan. 4, 2024

(30) Foreign Application Priority Data
Aug. 18, 2020  (IN) .............................. 202041035474

(51) Int. Cl.
*B01D 36/00* (2006.01)
*B01D 29/15* (2006.01)
*B01D 35/00* (2006.01)

(52) U.S. Cl.
CPC ........... *B01D 36/003* (2013.01); *B01D 29/15* (2013.01); *B01D 35/005* (2013.01); *B01D 2201/302* (2013.01); *B01D 2201/304* (2013.01)

(58) Field of Classification Search
CPC .... B01D 36/003; B01D 29/15; B01D 35/005; B01D 2201/302; B01D 2201/304;
(Continued)

(56) References Cited

U.S. PATENT DOCUMENTS 3,167,507 A    1/1965  Burhans et al.
3,460,676 A    8/1969  Kasten
(Continued)

FOREIGN PATENT DOCUMENTS

CN    102341136 A    2/2012
CN    210034726 U    2/2020
(Continued)

OTHER PUBLICATIONS

International Search Report and Written Opinion issued for PCT Application No. PCT/US2021/046134 issued Nov. 22, 2021, 11 pages.
(Continued)

Primary Examiner — Madeline Gonzalez
(74) Attorney, Agent, or Firm — Benesch Friedlander Coplan & Aronoff LLP

(57) ABSTRACT

A filter assembly comprises a housing defining an internal volume and comprising an inlet for receiving fuel, a first outlet to allow filtered fuel to exit the internal volume, and a second outlet to allow water separated from the fuel to exit the internal volume. A filter element is disposed within the internal volume for filtering the fuel to provide the filtered fuel and separate the water from the fuel. An outlet assembly is fluidly coupled to the first and second outlets and comprises a first flow path structured to communicate the filtered fuel to the first outlet, and a second flow path fluidly coupled to the internal volume of the housing and to the water reservoir so as to receive the water from the internal volume
(Continued)

and communicate the water to the water reservoir. The second flow path is fluidly isolated from the first flow path.

21 Claims, 12 Drawing Sheets

(58) Field of Classification Search
CPC ........ B01D 2201/291; B01D 2201/303; B01D 29/54; B01D 29/58; B01D 36/006
USPC ..... 210/435, 450, 442, 455, 493.2, 299, 312
See application file for complete search history.

(56) References Cited

U.S. PATENT DOCUMENTS

| | | | |
|---|---|---|---|
| 4,094,791 | A | 6/1978 | Conrad |
| 4,253,954 | A | 3/1981 | Midkiff et al. |
| 4,522,712 | A | 6/1985 | Fischer et al. |
| 4,735,716 | A | 4/1988 | Petrucci et al. |
| 4,743,374 | A | 5/1988 | Stifelman |
| 5,484,527 | A | 1/1996 | Janik et al. |
| 5,609,760 | A | 3/1997 | Leach |
| 5,958,237 | A | 9/1999 | Cort et al. |
| 6,571,962 | B2 | 6/2003 | Thomas |
| 8,231,793 | B2 | 7/2012 | Hacker et al. |
| 8,333,980 | B2 | 12/2012 | Van Nest et al. |
| 8,920,648 | B2 | 12/2014 | Thomas et al. |
| 8,932,465 | B2 | 1/2015 | Wells et al. |
| 9,011,685 | B2 | 4/2015 | Holker et al. |
| 9,211,488 | B2 * | 12/2015 | South ...................... B01D 35/30 |
| 9,925,481 | B2 * | 3/2018 | Hou ........................ B01D 29/23 |
| 10,881,995 | B2 | 1/2021 | Hou et al. |
| 2007/0227963 | A1 | 10/2007 | Fick et al. |
| 2009/0071892 | A1 | 3/2009 | Malgorn |
| 2010/0101993 | A1 | 4/2010 | Wells et al. |
| 2010/0200490 | A1 | 8/2010 | Martin et al. |
| 2011/0000833 | A1 | 1/2011 | Eberle |
| 2011/0042329 | A1 | 2/2011 | Hacker et al. |
| 2011/0284448 | A1 | 11/2011 | Dewes |
| 2013/0292310 | A1 | 11/2013 | Eberle et al. |
| 2013/0306531 | A1 | 11/2013 | Girondi |
| 2015/0096932 | A1 | 4/2015 | Hou et al. |
| 2016/0023139 | A1 | 1/2016 | Eberle et al. |
| 2016/0222931 | A1 | 8/2016 | Jiang et al. |
| 2017/0173502 | A1 | 6/2017 | Brall et al. |
| 2018/0185776 | A1 | 7/2018 | Hou et al. |
| 2020/0222836 | A1 | 7/2020 | Pokharkar et al. |

FOREIGN PATENT DOCUMENTS

| | | |
|---|---|---|
| DE | 195 38 883 A1 | 4/1997 |
| WO | 2012097851 A1 | 7/2012 |
| WO | 2013079172 A1 | 6/2013 |
| WO | WO-2015/018785 A1 | 2/2015 |

OTHER PUBLICATIONS

International Search Report and Written Opinion issued for PCT/CN2012/071499, issued Nov. 29, 2012, 11 pages.
Non-Final Office Action on U.S. Appl. No. 15/909,405 dtd Mar. 12, 2020.
Notice of Allowance on U.S. Appl. No. 15/909,405 dtd Sep. 15, 2020.
Office Action issued for Chinese Patent Application No. 201280064857.9, issued Oct. 9, 2015, 7 pages.
Office Action issued for Indian Patent Application No. 3880/CHENP/2014, issued on Dec. 18, 2018, 5 pages.
US Office Action issued for U.S. Appl. No. 14/372,834 issued Oct. 31, 2016, 19 pages.
First Office Action issued for Indian Patent Application No. 202347006427 issued Apr. 12, 2023, 6 pages.
Office Action issued for U.S. Appl. No. 17/117,342 issued May 10, 2023, May 10, 2023.
Extended Search Report issued for European Patent Application No. 21858894.5 issued Nov. 27, 2024, 12 pages.
Partial Search Report issued for European Patent Application No. EP 21858894.5 issued Sep. 6, 2024, 13 pages.
Office Action issued in Chinese Patent Application No. 2021800581474, dated Jul. 21, 2025.

* cited by examiner

FILTER ASSEMBLY INCLUDING SEPARATE FUEL AND WATER FLOW PATHS

CROSS-REFERENCE TO RELATED APPLICATIONS

The present application is a National Phase Application based on PCT/US2021/046134, filed Aug. 16, 2021, which claims priority to and benefit of Indian Provisional Application No. 202041035474, filed Aug. 18, 2020. The contents of these applications are incorporated herein by reference in their entireties.

TECHNICAL FIELD

The present disclosure relates generally to filtration systems for filtering fluids such as fuel.

BACKGROUND

Internal combustion engines generally combust a mixture of fuel (e.g., diesel, gasoline, natural gas, etc.) and air. Prior to entering the engine, the fuel is typically passed through a filter element to remove particulate matter (e.g., dust, metal particles, debris, etc.), and may also separate water from the fuel. Such fuel-water separator filter assemblies generally separate water at an outer diameter of the filter element, and the separated water accumulates in a water reservoir located below the filter element. The water reservoir is generally open to the outer diameter of the filter element. When such filter assemblies are included in vehicles, movement of the vehicles may cause the water to splash and contact the outer diameter of the filter element. This can wet the filter media of the filter element, which negatively impacts performance of the filter element.

SUMMARY

Embodiments described herein relate generally to fuel-water separator filter assemblies and in particular to filter assemblies that include an outlet assembly fluidly coupled to fuel and water outlets of a housing of the filter assembly within which a filter element is disposed. The outlet assembly defines a first flow path to allow filtered fuel to exit an internal volume of the housing, and a second flow path fluidly isolated from the first flow path. The second flow path is configured to allow water separated from the fuel to exit the internal volume to a location of the housing that is fluidly isolated from the internal volume of the housing within which the filter element is disposed.

In some embodiments, a filter assembly comprises a housing defining an internal volume. The housing comprises an inlet for receiving fuel, a first outlet to allow filtered fuel to exit the internal volume, and a second outlet to allow water separated from the fuel to exit the internal volume. A filter element is disposed within the internal volume for filtering the fuel so as to provide the filtered fuel and separate the water from the fuel. An outlet assembly is fluidly coupled to each of the first outlet and the second outlet. The outlet assembly comprises a first flow path and a second flow path. The first flow path is fluidly coupled to a clean side of the filter element and the first outlet so as to receive the filtered fuel from the clean side of the filter element and communicate the filtered fuel to the first outlet. A second flow path is fluidly coupled to the internal volume of the housing and to the second outlet so as to receive the water from the internal volume and communicate the water through the second outlet.

In some embodiments, a filter element for filtering fuel and separating water from fuel is configured to be disposed within an internal volume of a housing and comprises a filter media, and an endplate coupled to an end of the filter media. An outlet assembly is coupled to a bottom surface of the endplate. The filter element is configured to be disposed within an internal volume of a housing that comprises a first outlet to allow filtered fuel to exit the internal volume, and a second outlet to allow water separated from the fuel to exit the internal volume. The outlet assembly comprises an outer wall defining a flow channel therethrough. A set of inner walls is disposed within the flow channel and extends radially from a central axis of the outer wall to an inner surface of the outer wall such that the flow channel is divided into a plurality of flow paths. A first set of the plurality of flow paths forms a first flow path fluidly coupled to a clean side of the filter media and configured to be fluidly coupled to a first outlet of the housing so as to receive the filtered fuel from the clean side of the filter media and communicate the filtered fuel to the first outlet so as to allow the filtered fuel to exit the internal volume. A second set of the plurality of flow paths forms a second flow path configured to be fluidly coupled to the internal volume of the housing and to a second outlet of the housing so as to receive the water from the internal volume and communicate the water through the second outlet so to allow the water separated from the fuel to exit the internal volume.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1A:
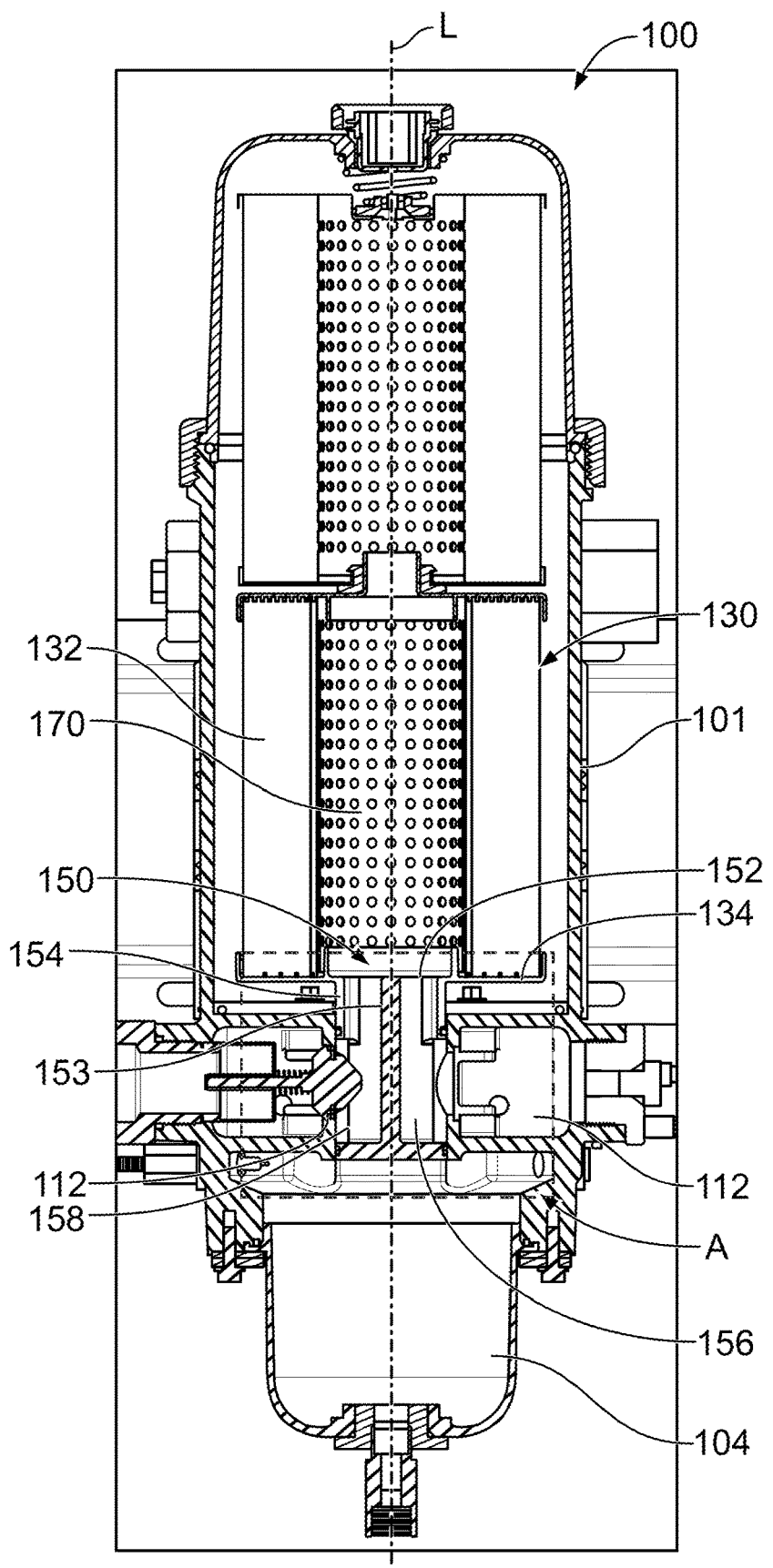
FIG. 1A is a side cross-sectional view of a filter assembly, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to fuel-water separator filter assemblies and in particular to filter assemblies that include an outlet assembly fluidly coupled to fuel and water outlets of a housing of the filter assembly within which a filter element is disposed. The outlet assembly defines a first flow path to allow filtered fuel to exit an internal volume of the housing, and a second flow path fluidly isolated from the first flow path, the second flow path configured to allow water separated from the fuel to exit the internal volume to a location of the housing that is fluidly isolated from the internal volume of the housing within which the filter element is disposed.

Embodiments of the filter assembly described herein may provide various benefits including, for example: (1) separating a water reservoir from the filter media while allowing water to flow from an interior volume of the housing to the water reservoir; (2) providing separate outlets for fuel and water in a concise space; and (3) mitigating reduction in filtering efficiency by inhibiting separated water from contacting the filter element.

FIGS. 1A-2B show various views of a fuel-water separator filter assembly (hereinafter "filter assembly 100"), according to an embodiment. The filter assembly 100 comprises a housing 101, a filter element 130, a separator plate 140, and an outlet assembly 150.

The housing 101 defines an internal volume 105 within which the filter element 130 is disposed along a longitudinal axis $A_L$ of the housing 101. The housing 101 defines an inlet 102 for receiving unfiltered fuel (FIG. 2A-2B), for example, defined on a side wall of the housing 101. Also referring to FIGS. 3-4, a lower portion 101a of the housing 101 defines a first outlet 112 to allow filtered fuel to exit the housing 101, and a second outlet 114 to allow water separated from the fuel to exit the housing 101. The second outlet 114 includes a longitudinal conduit defined in the lower portion 101a of the housing 101, which is axially aligned with the longitudinal axis $A_L$ of the filter assembly 100. The first outlet 112 may include orthogonal conduits oriented orthogonal to the second outlet 114, for example, extending orthogonally in opposite directions from a sidewall of the second outlet 114 and fluidly coupled to the second outlet 114.

The filter element 130 is removably disposed in the internal volume 105 defined by the housing 101. The filter element 130 includes a filter media 132 that may be disposed around a center tube 170 that defines a central channel. The filter element 130 is a radial flow filter element configured to filter the fuel as the fuel flows in a radial direction from an outer radial surface of the filter media 132, and through the filter media 132 into the central channel as filtered fuel, for example, via a plurality of openings defined in the center tube 170. A hydrophobic layer or other water separation layer or any other water separation feature may be provided on the outer radial surface of the filter media 132 for separating water from the fuel. The separated water flows through the internal volume 105 towards a water reservoir 104, which is coupled to the lower portion 101a of the housing 101, through the outlet assembly 150. An endplate 134 is coupled to a lower end of the filter media 132 proximate to the lower portion 101a of the housing 101.

Also referring to FIGS. 5-8, a separator plate 140 is disposed in the lower portion 101a of the housing 101 such that the separator plate 140 forms a base of the internal volume 105 defined by the housing 101. In various embodiments, the separator plate 140 may be integrally formed with the housing 101, for example being molded as part of the housing 101. The separator plate 140 is structured to fluidly isolate a section of the lower portion 101a of the housing 101, which receives the separated water and is in fluid communication with the water reservoir 104, from the internal volume 105. In this manner, the separator plate 140 inhibits the separated water collected in the water reservoir 104 from splashing on to the outer radial surface of the filter media 132.

Figure 3:
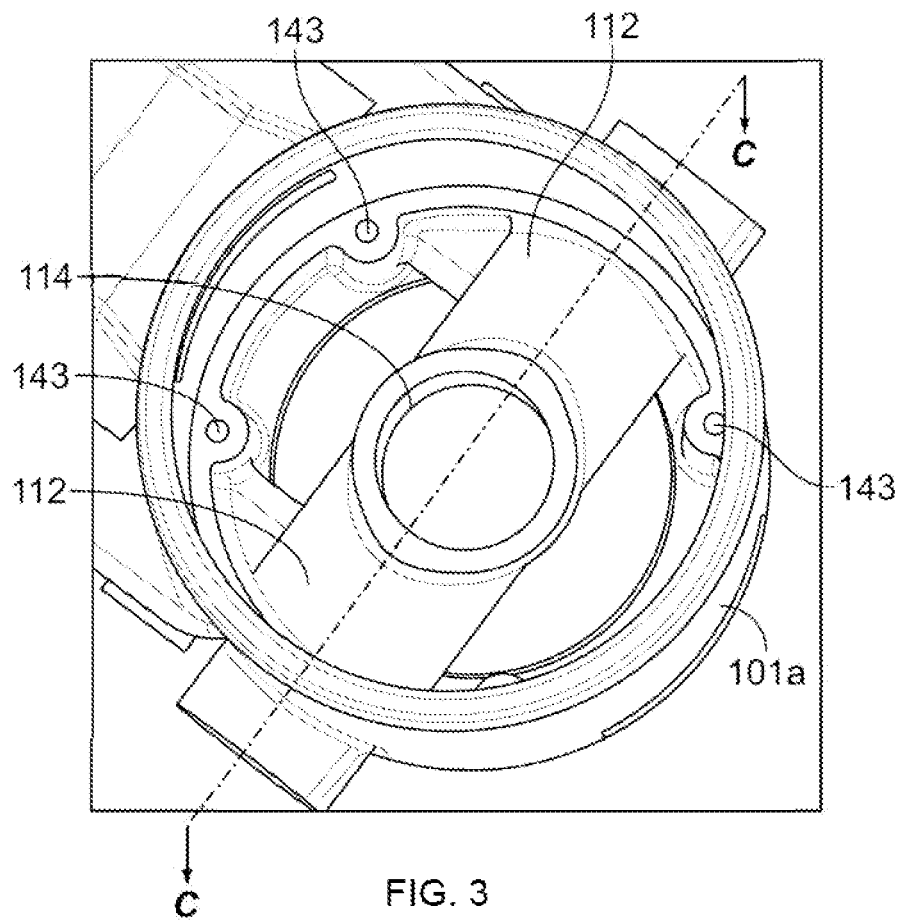
FIG. 3 is a top perspective view of a lower portion of a housing of the filter assembly of FIG. 1A showing a first outlet and a second outlet, according to an embodiment.
Figure 4:
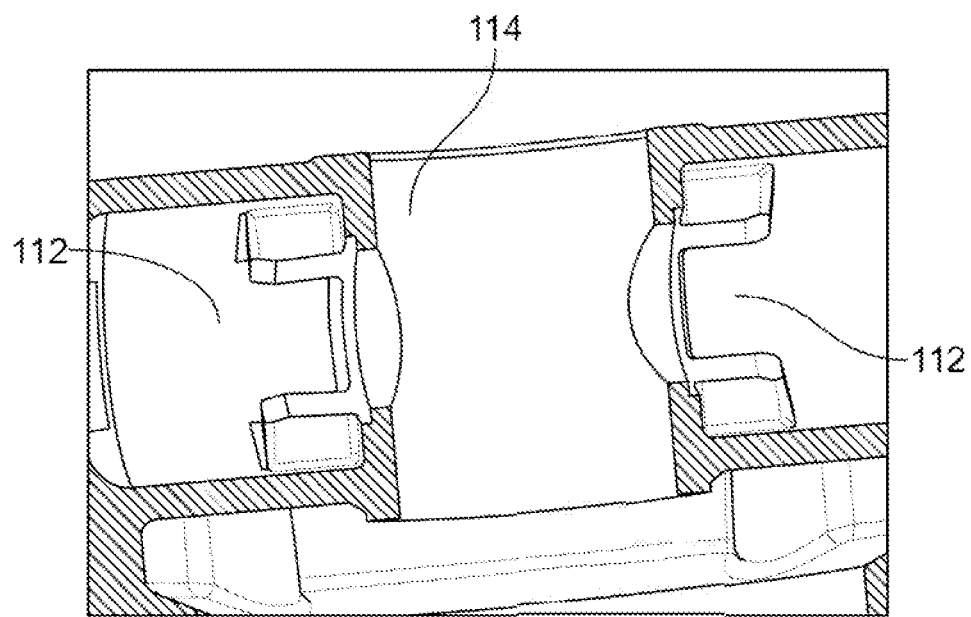
FIG. 4 is a side cross-section of the lower portion of the housing of FIG. 3 taken along the line C-C in FIG. 3.
Figure 5:
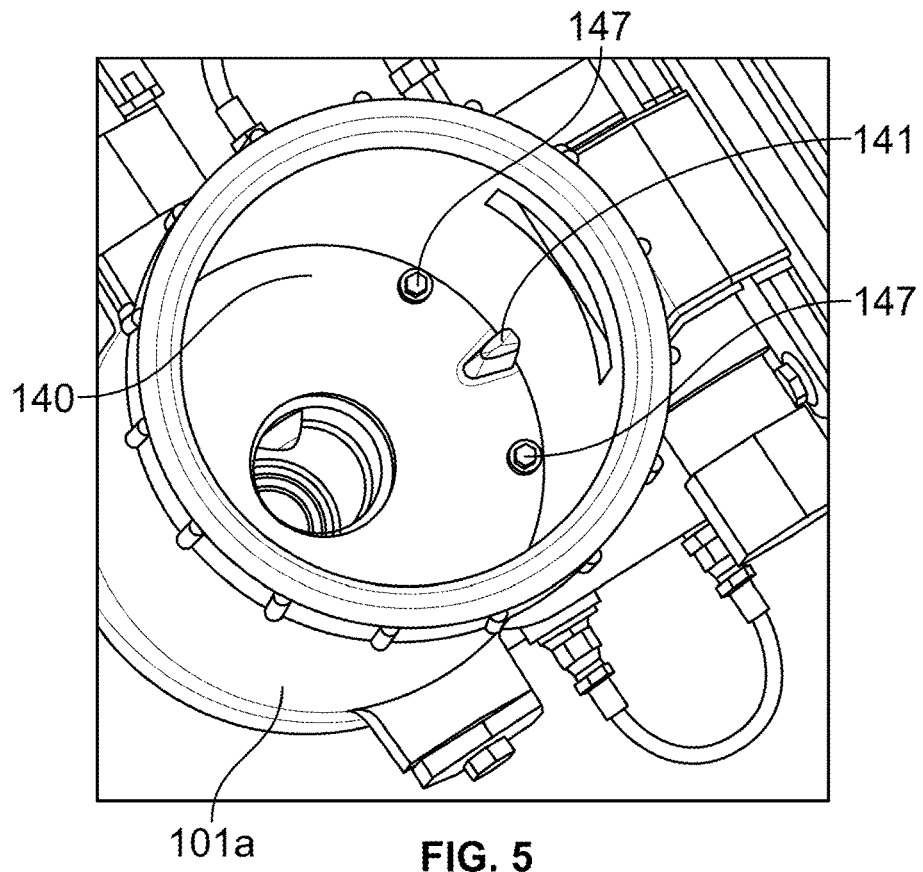
FIG. 5 is another top perspective view of the lower portion of the housing showing a separator plate disposed in the lower portion of the housing, according to an embodiment.
Figure 6:
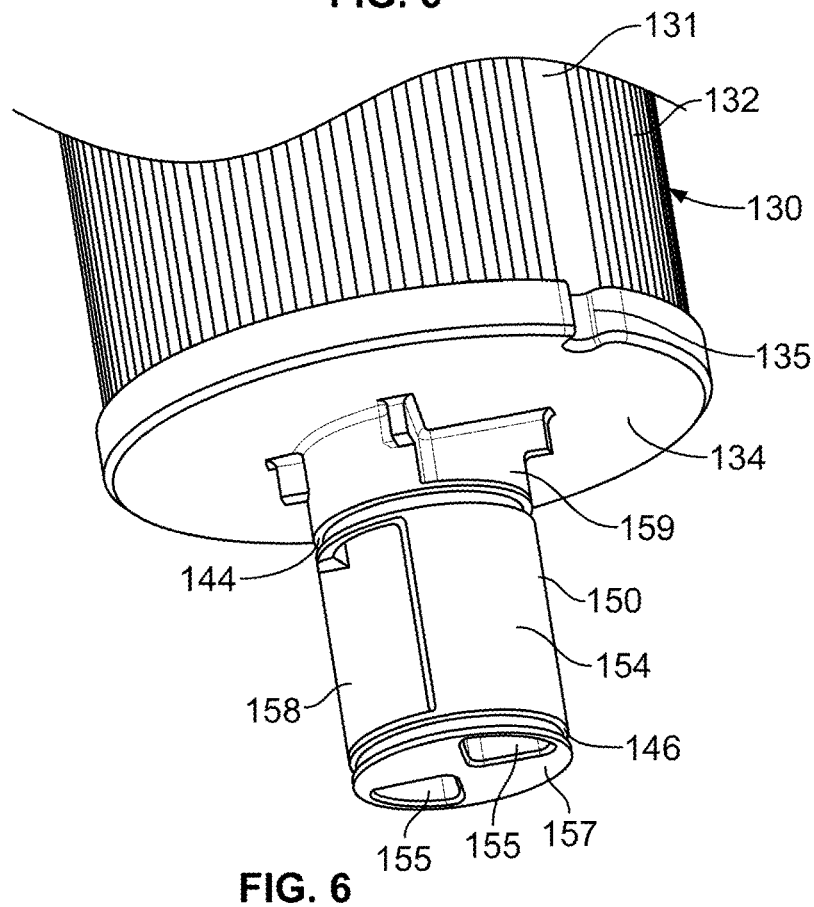
FIG. 6 is a side perspective view of a portion of a filter element and an outlet assembly included in the filter assembly of FIGS. 1A-2B, according to a particular embodiment.
Figure 7:
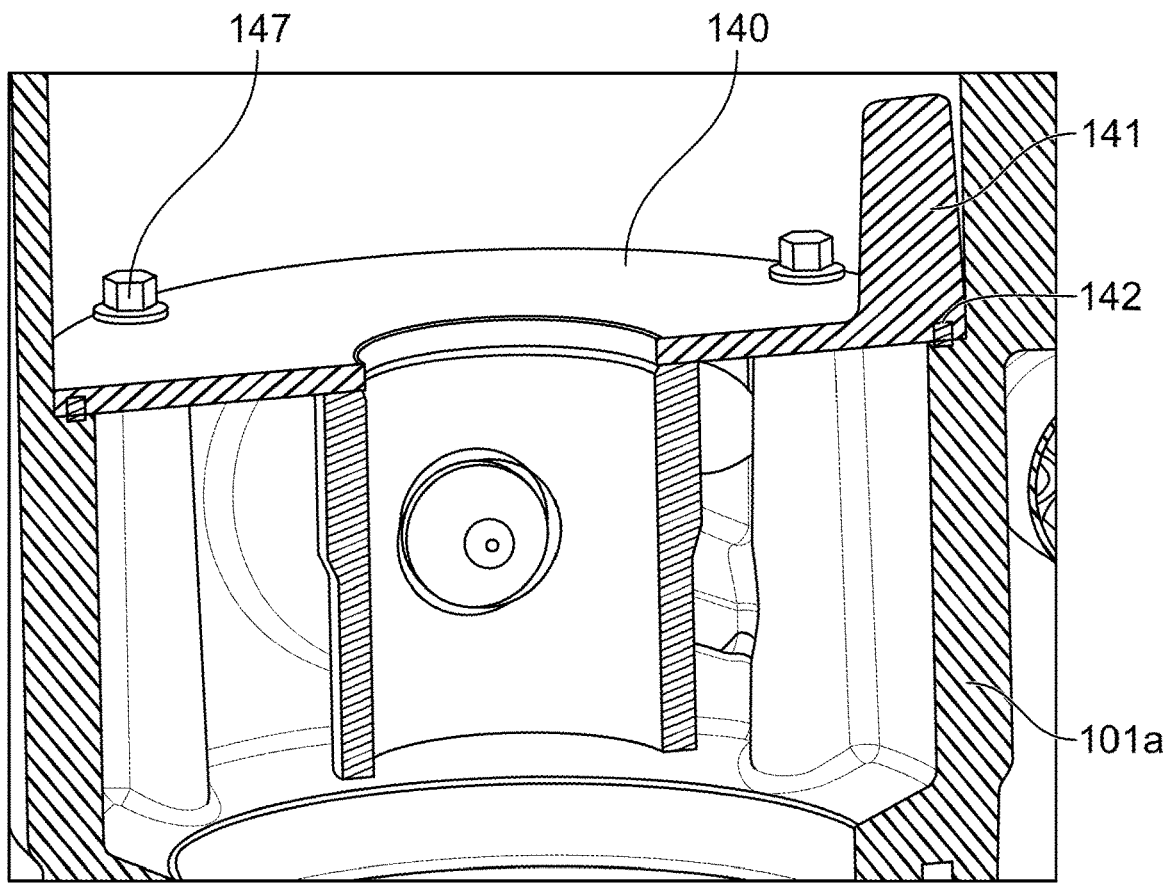
FIG. 7 is a side perspective view of the lower portion of the housing shown in FIG. 5.
Figure 8:
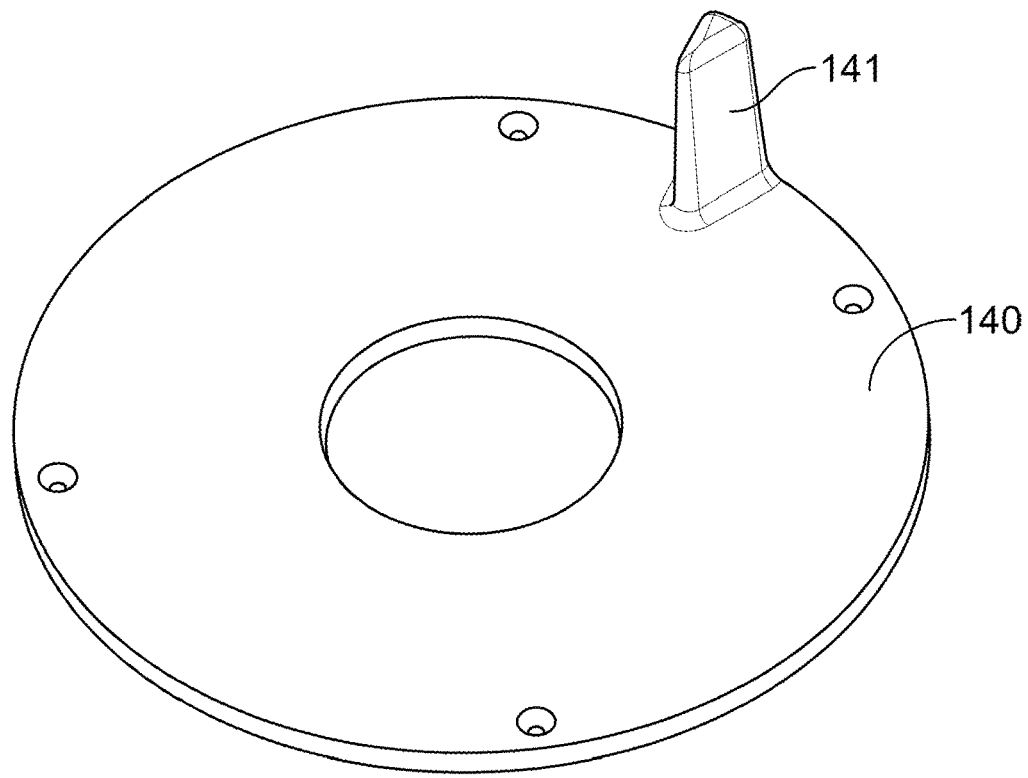
FIG. 8 is a top perspective view of the separator plate of FIG. 5.

As shown in FIG. 3, the lower portion 101a of the housing 101 defines a plurality of apertures 143 (e.g., bosses) for receiving coupling members 147 (e.g., screws, bolts, etc.) that couple the separator plate 140 to the lower portion 101a. A protrusion 141 is defined in the separator plate 140 and extends from proximate to a radial periphery of the separator plate 140 towards the filter element 130 (FIG. 5). The protrusion 141 is configured to mate with a corresponding endplate slot 135 defined in the endplate 134, and in some embodiment, also a filter element slot 131 defined in the filter media 132. The protrusion 141 and corresponding endplate slot 135 and filter element slot 131 provide a poke-yoke feature for ensuring proper alignment of the filter element 130 within the internal volume 105 (FIG. 6), and/or preventing non-genuine filter elements from being used in the filter assembly 100. A first sealing member 142 (e.g., an O-ring or gasket) is disposed between the separator plate 140 and the lower portion 101a proximate to an outer periphery of the separator plate 140, and fluidly seals the internal volume 105 from sections of the lower portion 101a located below the separator plate 140.

The outlet assembly 150 is coupled to each of the first outlet 112 and the second outlet 114. The outlet assembly 150 is coupled to the endplate 134, for example, may be integrally formed with the endplate 134. In other embodiments, the outlet assembly 150 may be a separate component coupled to endplate 134, for example, via coupling members, being snap-fit, or being welded to the endplate 134. The outlet assembly 150 comprises a first flow path fluidly coupled to a clean side of the filter element 130, i.e., the central channel defined by the center tube 170 and the first outlet 112. The first flow path receives the filtered fuel from the clean side of the filter element 130 and communicates the filtered fuel to the first outlet 112. Moreover, the outlet assembly 150 also comprises a second flow path fluidly coupled to the internal volume 105 of the housing 101 and to the second outlet 114. The second flow path receives the water from the internal volume 105 and communicates the water through the second outlet 114. In some embodiments, at least a portion of the outlet assembly 150 that defines the first flow path and the second flow path is disposed through the second outlet 114.

Referring to FIGS. 1A-2B and 6, the outlet assembly 150 includes a tube like structure, a portion of which is disposed through the second outlet 114. The outlet assembly 150 includes an outer wall 154 that defines a flow channel therethrough. A set of inner walls 156 are disposed within the flow channel defined by the outer wall 154 and extend radially from a central axis of the outer wall 154 to an inner surface of the outer wall 154 such that the flow channel is divided into four flow paths, two forming the first flow path, and the remaining two forming the second flow path. In other embodiments, any number of inner walls 156 may be used to form any number of flow paths, with any combination of the flow paths being dedicated for the first flow path and the second flow path. The outer wall 154 and the set of inner walls 156 are partially disposed in the second outlet 114 such that a portion of the outer wall 154 extends into the internal volume 105 and a space for water to flow is provided between the endplate 134 and the separator plate 140.

The first flow path is defined between a first portion of the outer wall 154 and the set of inner walls 156. For example, the outlet assembly 150 defines a filtered fuel inlet 152 in fluid communication with the central channel and configured to receive filtered fuel. The outer wall 154 defines a set of first outer wall openings 158 at locations of the outer wall 154 that are aligned with corresponding first outlets 112. An outlet assembly base 157 is disposed at an end of the outlet assembly 150 distal from the filter element 130, and oriental orthogonal to the outer wall 154, An outlet assembly first sealing member 144 (e.g., an O-ring or gasket) is disposed between the outer wall 154 and the second outlet 114 at location proximate to the filter element 130, and an outlet assembly second sealing member 146 (e.g., an O-ring or gasket) is disposed between the outlet assembly base 157 and the second outlet 114 at a lower end of the outlet assembly 150 distal from the filter element 130. The outlet assembly first sealing member 144 and the outlet assembly second sealing member 146 may be structured to provide facial and/or radial sealing.

Figure 1B:
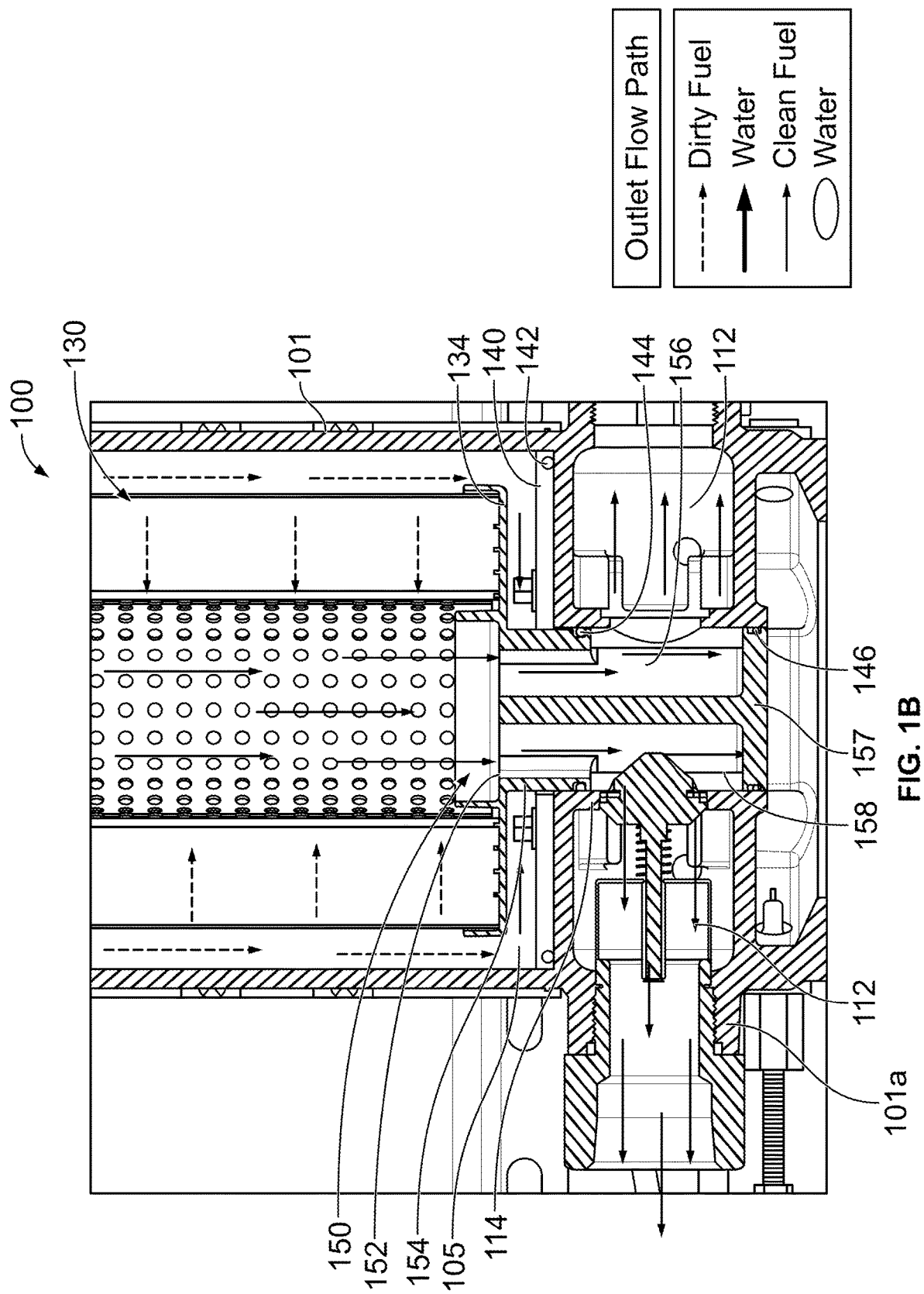
FIG. 1B is a side cross-section view of a portion of the filter assembly of FIG. 1A indicated by the arrow A in FIG. 1A.

As shown in FIG. 1B, the first flow path is defined from the filtered fuel inlet 152 and between the first portion of the outer wall 154 and the set of inner walls 156 to the first outer wall openings 158 that are in fluid communication with corresponding first outlets 112. The outlet assembly base 157 fluidly isolates the first flow path from second flow path and the section of the lower portion 101a that is in fluid communication with the water reservoir 104.

Figure 2A:
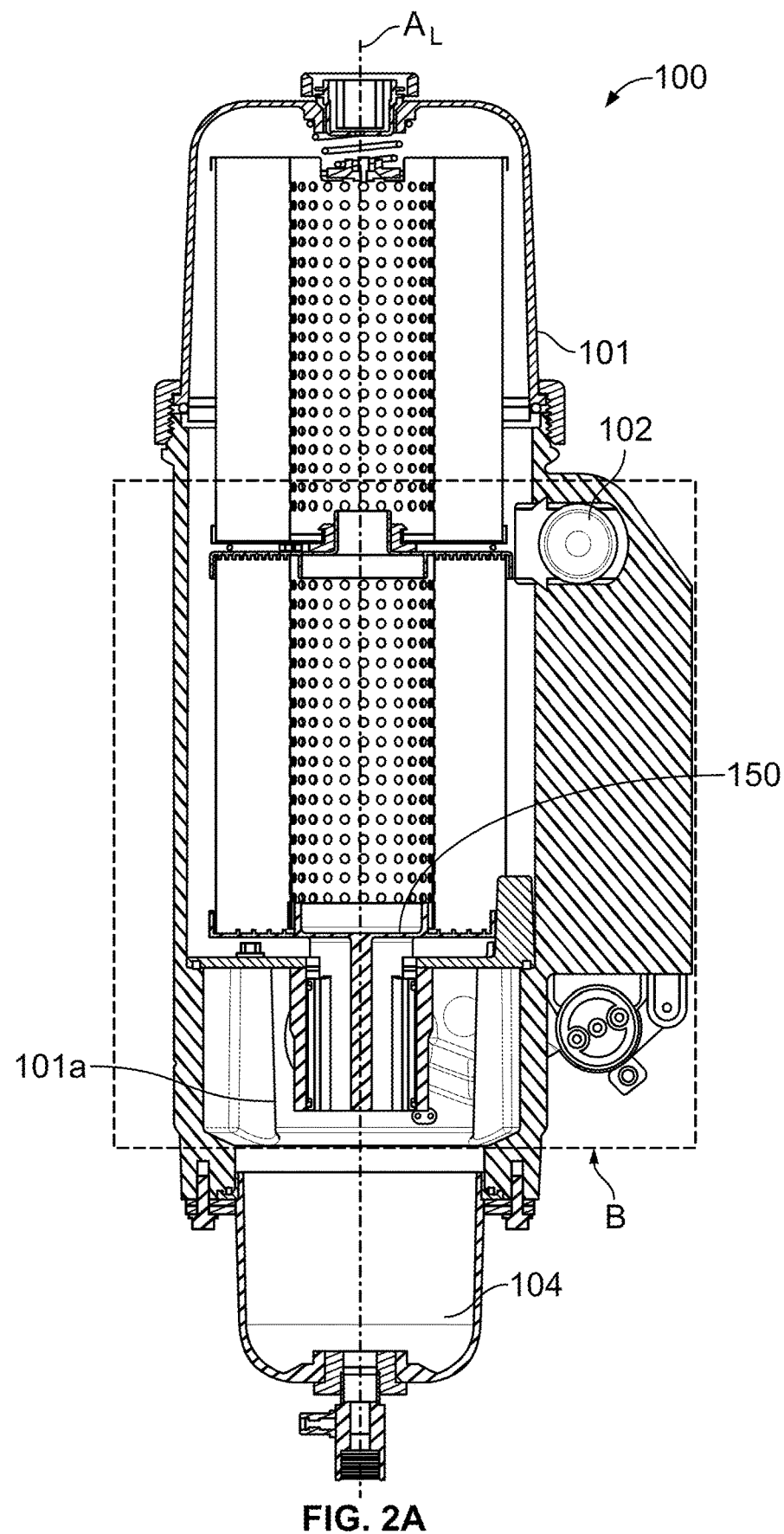
FIG. 2A is another side cross-sectional view of the filter assembly of FIG. 1A.
Figure 2B:
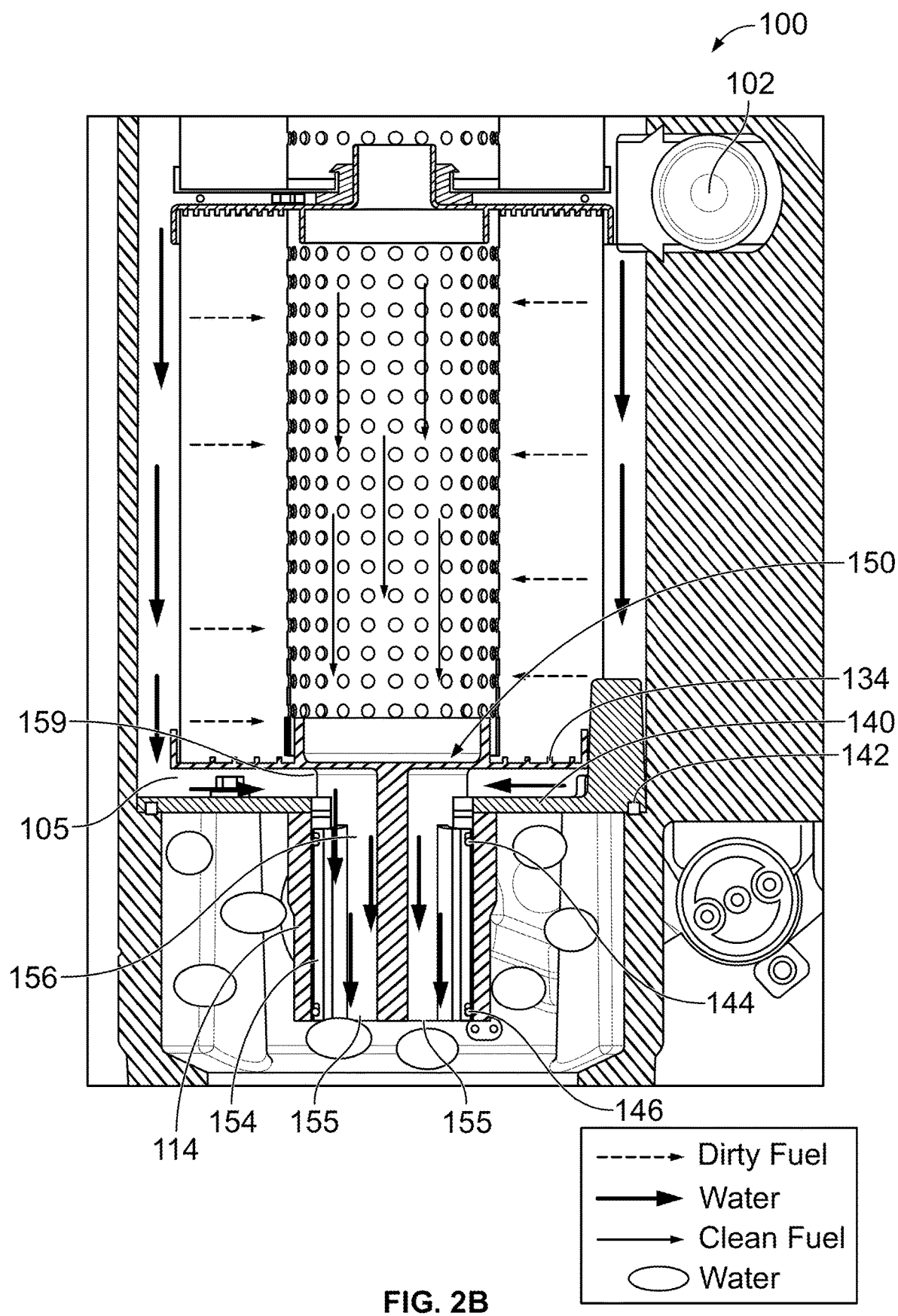
FIG. 2B is a side cross-sectional view of another portion of the filter assembly of FIG. 1A indicated by the arrow B in FIG. 2A.

A second portion of the outer wall 154 proximate to the filter element 130 defines a set of second outer wall openings 159 (FIGS. 2B and 6) at a location that is axially and radially offset from the set of first outer wall openings 158 and is proximate to the filter element 130. The set of second outer wall openings 159 are in fluid communication with the internal volume 105. The second portion of the outer wall 154 and the set of inner walls 156 define the second flow path therebetween that is distinct from, and fluidly isolated from the first flow path. The outlet assembly base 157 defines a set of water outlets 155 that are in fluid communication with the second flow path. As shown in FIG. 2B, separated water flows through the set of second outer wall openings 159 between the second portion of the outer wall 154 and the set of inner walls 156 through the set of water outlets 155 into the section of the lower portion 101a that is fluidly isolated from the internal volume 105 by the separator plate 140, and therefrom into the water reservoir 104.

Figure 9:
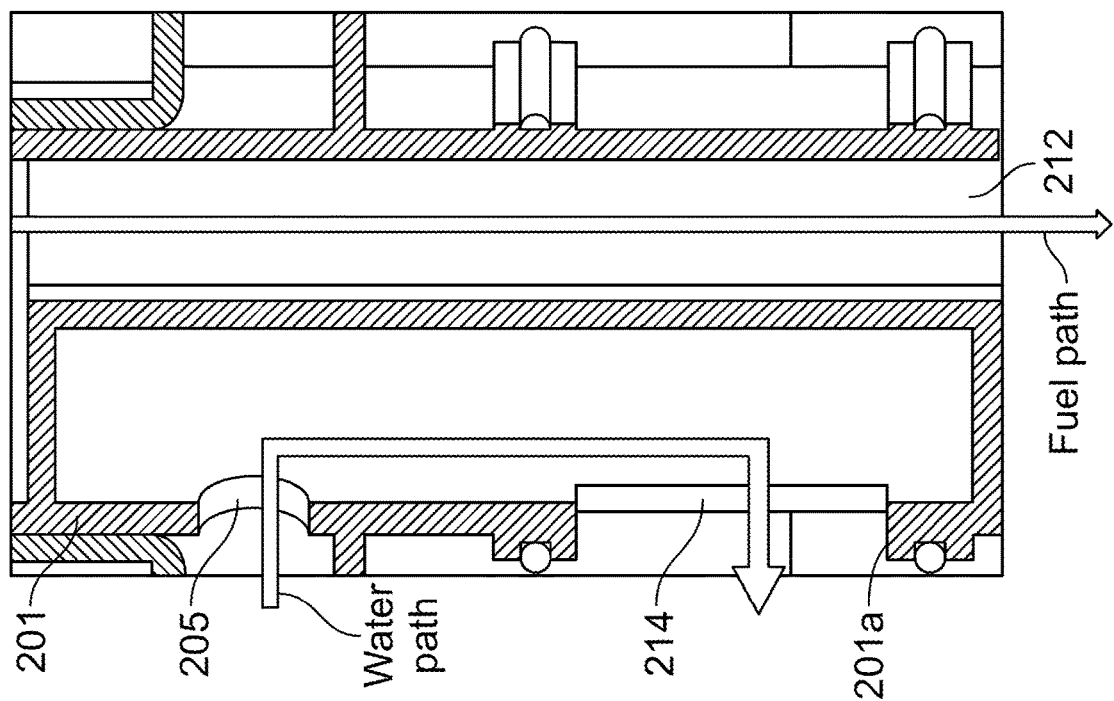
FIG. 9 is a side cross-section view of a portion of a filter assembly, according to another embodiment.

FIG. 9 is a side cross-section view of a portion of a filter assembly 200, according to another embodiment. The filter assembly 200 shows another flow path of separated water and filtered fuel through a housing 201 of the filter assembly 200. In this embodiment, the water flows into a lower portion 201a of the housing 201 via a water inlet 205 defined in a radial sidewall of the lower portion 201a at a location distal from a lower end of lower portion 201a. The separated water exits via a water outlet 214 also defined in the sidewall at a location proximate to the lower end relative to the water inlet 205. Filtered fuel flows through a central channel 212 defined in the housing 201 that is parallel to or axially aligned with a longitudinal axis of the housing 201.

Figure 10:
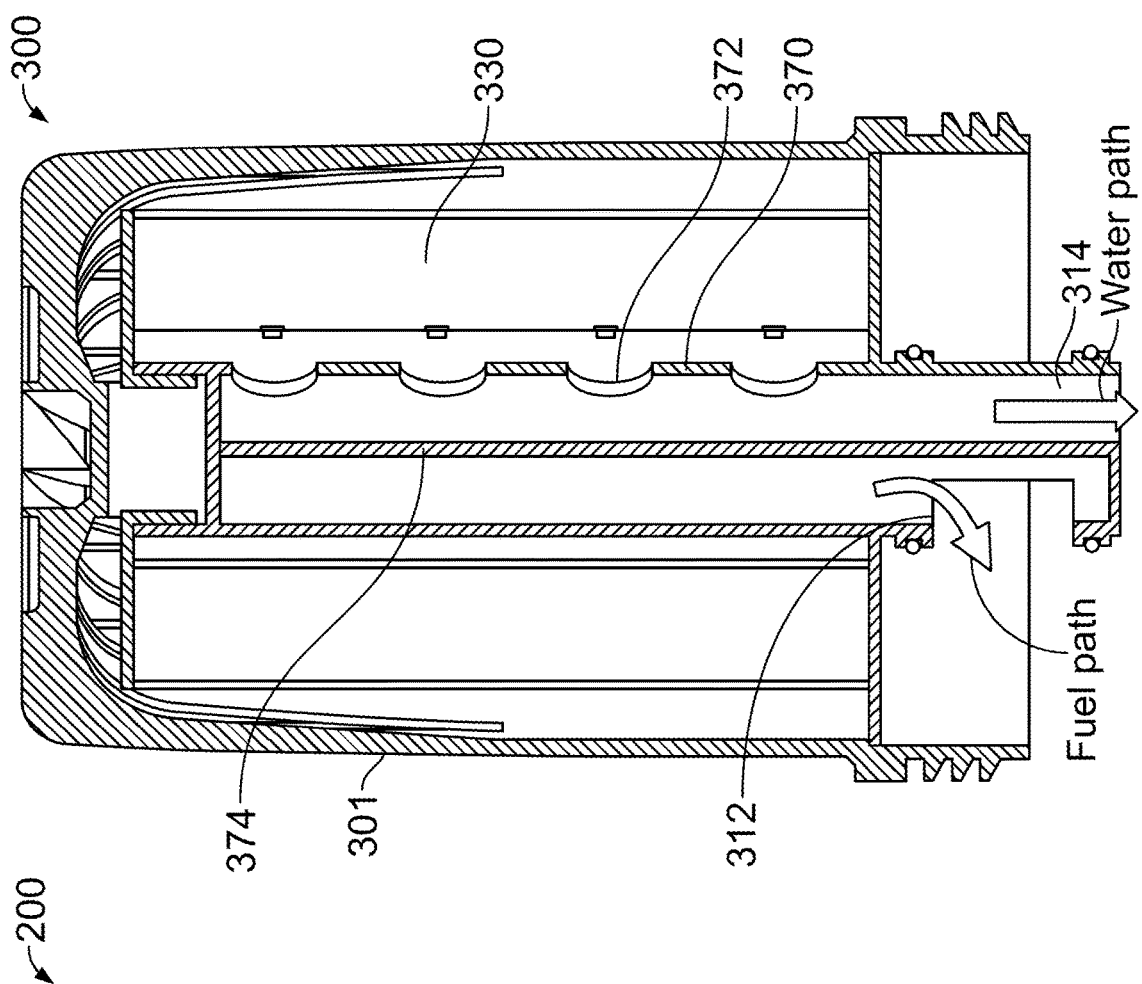
FIG. 10 is a side cross-section view of a filter assembly, accordingly to still another embodiment.

FIG. 10 is a side cross-section view of a filter assembly 300, accordingly to still another embodiment. The filter assembly 300 includes a housing 301 and a filter element 330 disposed in the housing 301 around a center tube 370 that defines a central channel and a plurality of pores 372. A hydrophobic screen 374 is disposed in the center tube 370 and divides the central channel into a first channel 312 and a second channel 314. The hydrophobic screen 374 is structured to allow fuel to pass therethrough from the second channel 314 to the first channel 312, but strips any water included in the fuel. The separated water then falls under gravity down through the second channel 314 and is eventually expelled from the housing 301.

Figure 11:
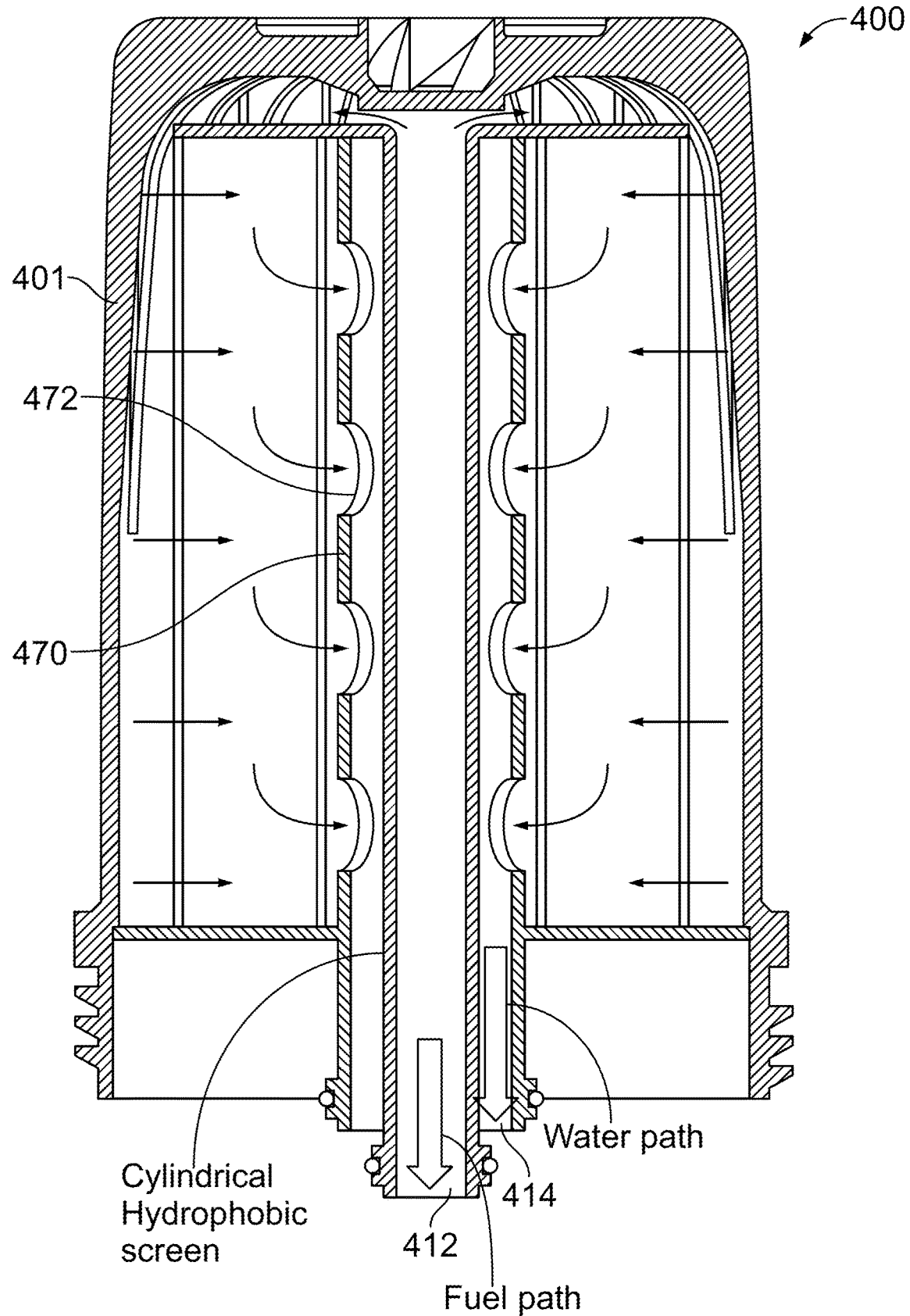
FIG. 11 is a side cross-section view of a filter assembly, according to yet another embodiment.

FIG. 11 is a side cross-section view of a filter assembly 400, according to yet another embodiment. The filter assembly 400 includes a housing 401 and a filter element disposed in the housing 401 around a center tube 470 that defines a central channel and a plurality of pores 472. A hydrophobic screen 412 is disposed within the center tube 470. The hydrophobic screen 412 is shaped as a hollow cylinder to provide a fuel flow path. Fuel flows through the hydrophobic screen 412 into the flow path and therethrough, out of the housing 401. Moreover, a water flow path 414 is defined between the center tube 470 and an outer surface of the hydrophobic screen 412. Water is separated from the fuel by the hydrophobic screen 412. The separated water accumulates on the hydrophobic screen 412 and eventually falls under gravity through the water flow path 414 and out of the housing 401.

Figure 12:
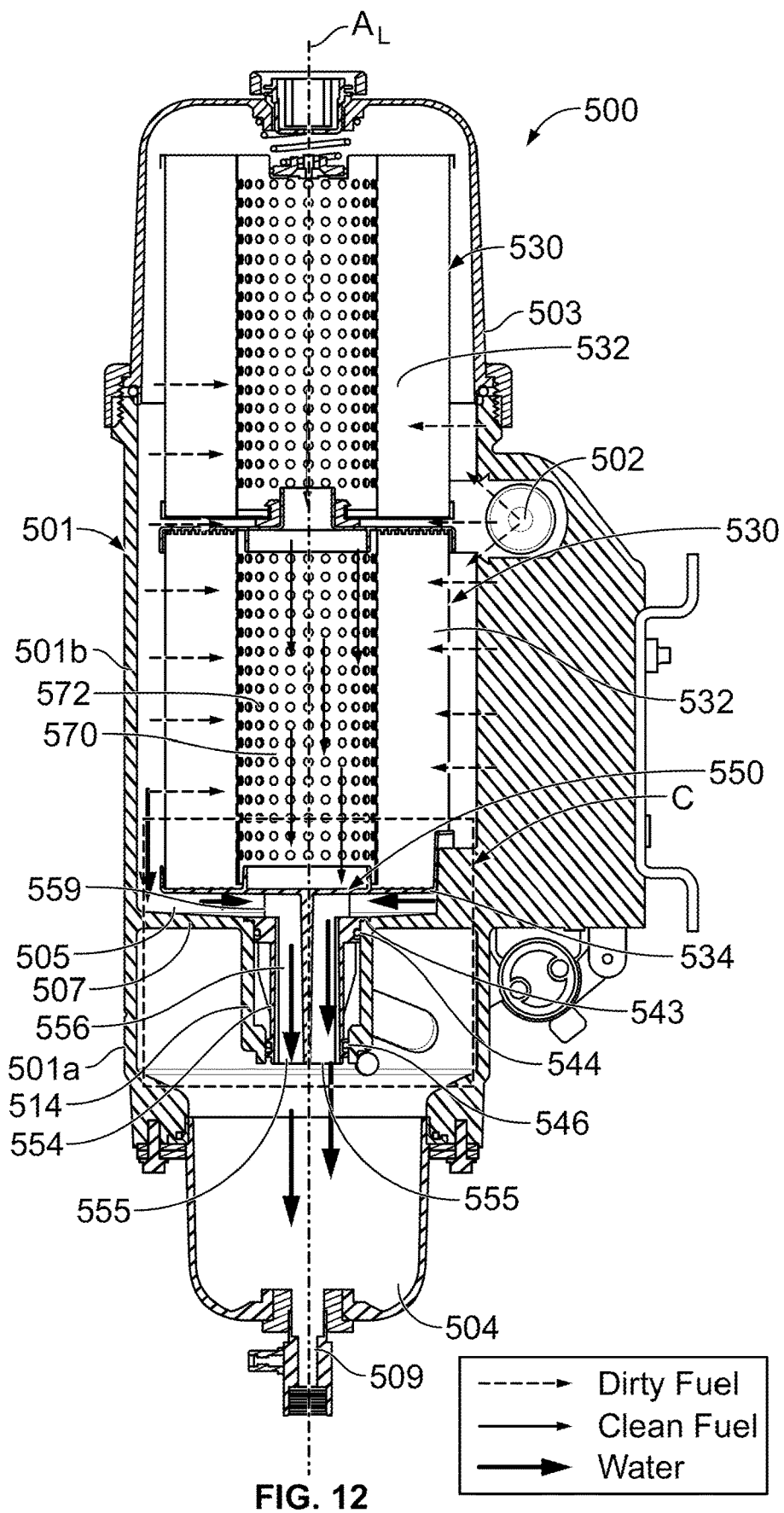
FIG. 12 is a side cross-sectional view of a filter assembly, according to another embodiment.
Figure 13:
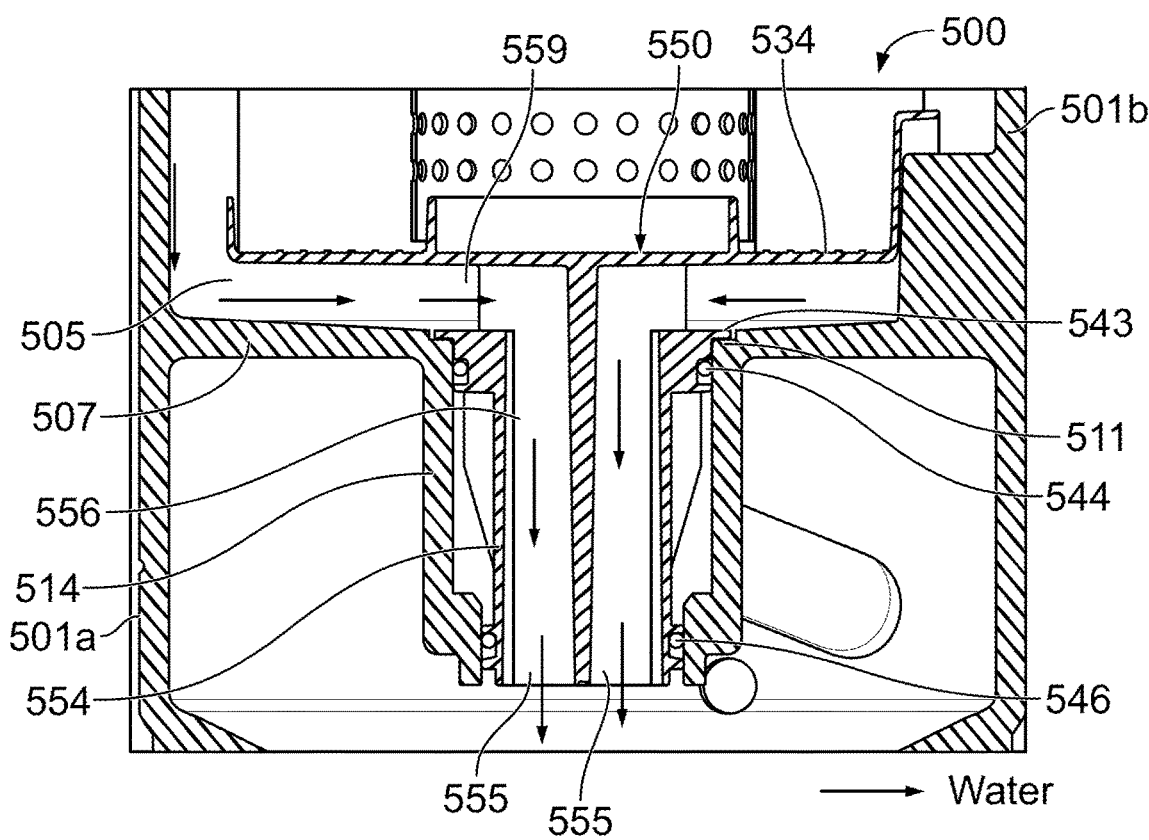
FIG. 13 is a side cross-sectional view of a portion of the filter assembly of FIG. 12 indicated by the arrow C in FIG. 12.
Figure 14:
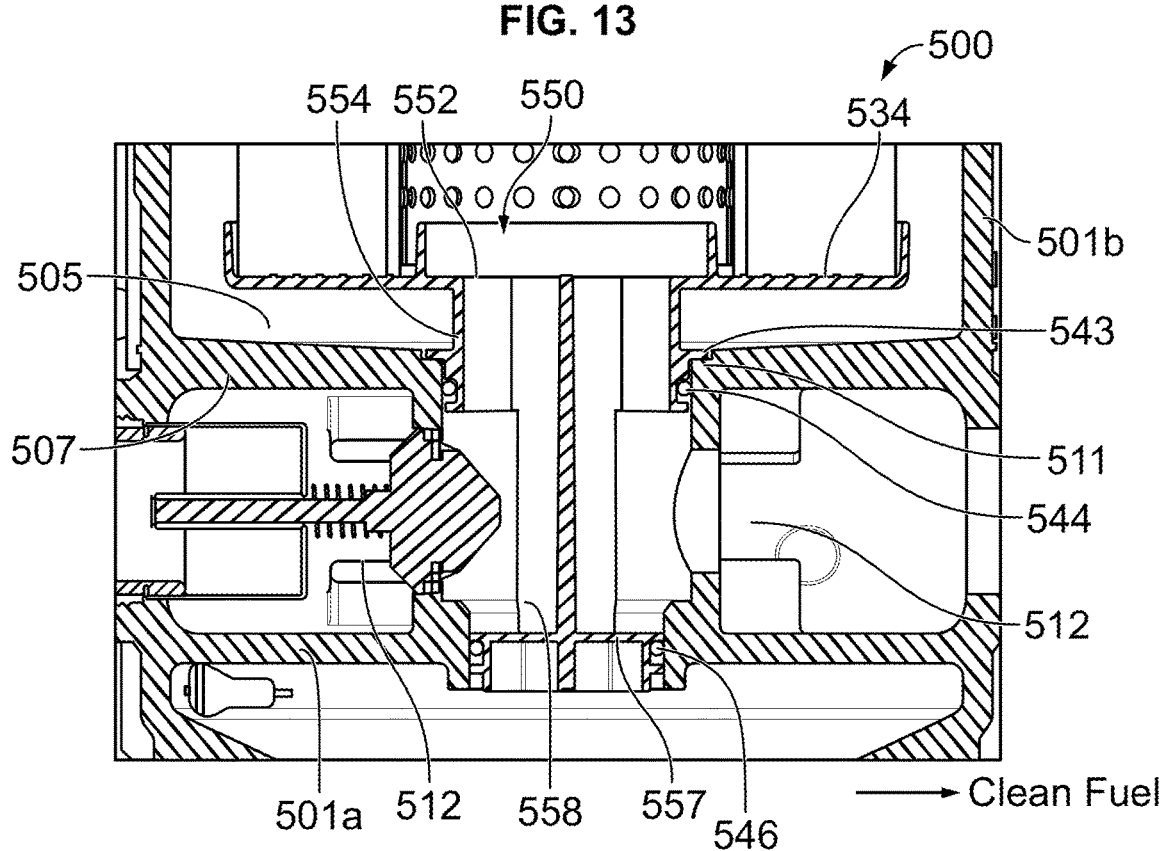
FIG. 14 is another side cross-sectional view of the portion of the filter assembly of FIG. 12 indicated by the arrow C in FIG. 12, which is orthogonal to the side cross-sectional view shown in FIGS. 12 and 13.

FIGS. 12-14 show various views of a fuel-water separator filter assembly 500 (hereinafter "filter assembly 500"), according to another embodiment. The filter assembly 500 comprises a housing 501, a filter element 530, and an outlet assembly 550.

The housing 501 defines an internal volume 505 within which the filter element 530 is disposed along a longitudinal axis $A_L$ of the housing 501. The housing 501 defines an inlet 502 for receiving dirty or unfiltered fuel (FIG. 12), for example, defined on a side wall of the housing 501. The housing 501 includes a lower portion 501a, and an upper portion 501b that defines the internal volume 505 within which the filter element 530 is disposed. The upper portion 501b is separated from the lower portion 501a by an upper portion base 507 such that that upper portion base 507 forms a base of the internal volume 505. In various embodiments, the lower portion 501a and the upper portion 501b are monolithically formed (e.g., in a single casting or molding step). A cover 503 is coupled to a top end of the upper portion 501b. Sidewalls of the cover 503 may extend axially upward of the upper portions 501b such that a portion of the filter element 530 is disposed within the cover 503. A water reservoir 504 is coupled to a bottom end of the lower portion 501a opposite the top end of the upper portion 501b, and is structured to store water separated from dirty fuel therein. A drain 509 may be defined in the water reservoir 504 and structured to allow selective draining of the collected water from the water reservoir 504.

Also referring to FIGS. 13-14, the lower portion 501a of the housing 501 defines a first outlet 512 to allow filtered fuel to exit the housing 501, and a second outlet 514 to allow water separated from the fuel to exit the housing 501. The second outlet 514 includes a longitudinal conduit defined in the lower portion 501a of the housing 501, which is axially aligned with the longitudinal axis $A_L$ of the filter assembly 500. The first outlet 512 may include orthogonal conduits oriented orthogonal to the second outlet 514, for example, extending orthogonally in opposite directions from a sidewall of the second outlet 514 and fluidly coupled to the second outlet 514.

The filter element 530 is disposed in the internal volume 505 defined by the housing 501. The filter element 530 includes a filter media 532 that may be disposed around a center tube 570 that defines a central channel. The filter element 530 is a radial flow filter element configured to filter the fuel as the fuel flows in a radial direction from an outer radial surface of the filter media 532 and through the filter media 532 into the central channel within the center tube 570 as filtered fuel, for example, via a plurality of openings 572 defined in the center tube 570. An endplate 534 is coupled to a lower end of the filter media 532 proximate to the lower portion 501a of the housing 501.

A hydrophobic layer or other water separation layer or any other water separation feature may be provided on the outer radial surface of the filter media 532 for separating water from the fuel as the fuel flows through the filter media 532. The separated water flows through the internal volume 505 towards a water reservoir 504, which is coupled to the lower portion 501a of the housing 501, through the outlet assembly 550. An endplate 534 is coupled to a lower end of the filter media 532 proximate to the lower portion 501a of the housing 501. Different from the filter assembly 100, the filter assembly 500 does not include a separator plate. Instead, the separated water flows over the upper portion base 507 towards the outlet assembly 550 and flows through portions of the outlet assembly, as described herein, towards the water reservoir 504. Removing the separator plate from the filter assembly 500 reduces manufacturing costs and complexity. In some embodiments, the upper portion base 507, or at least an upper surface of the upper portion base 507 may taper downwards towards the outlet assembly 550 (e.g., at an angle in a range of 5 degrees to 10 degrees) so as to urge the separated water to flow towards the outlet assembly 550 as water coalesces on the outer radial surface of the filter element 530, flows down the outer radial surface and onto the upper portion base 507.

Figure 15:
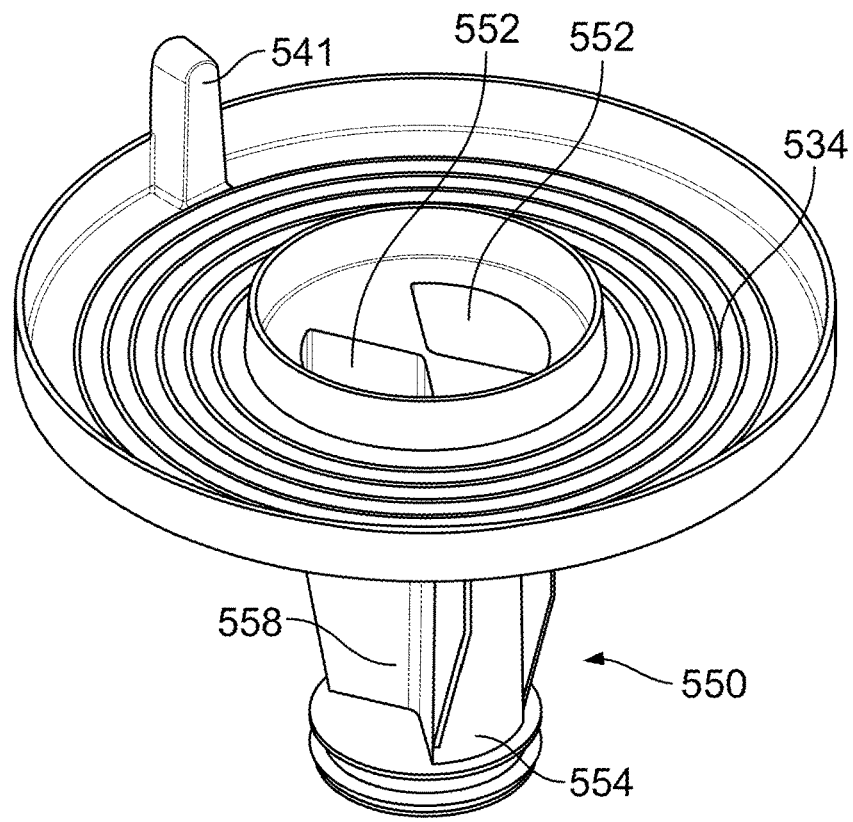
FIG. 15 is a top perspective view.
Figure 16:
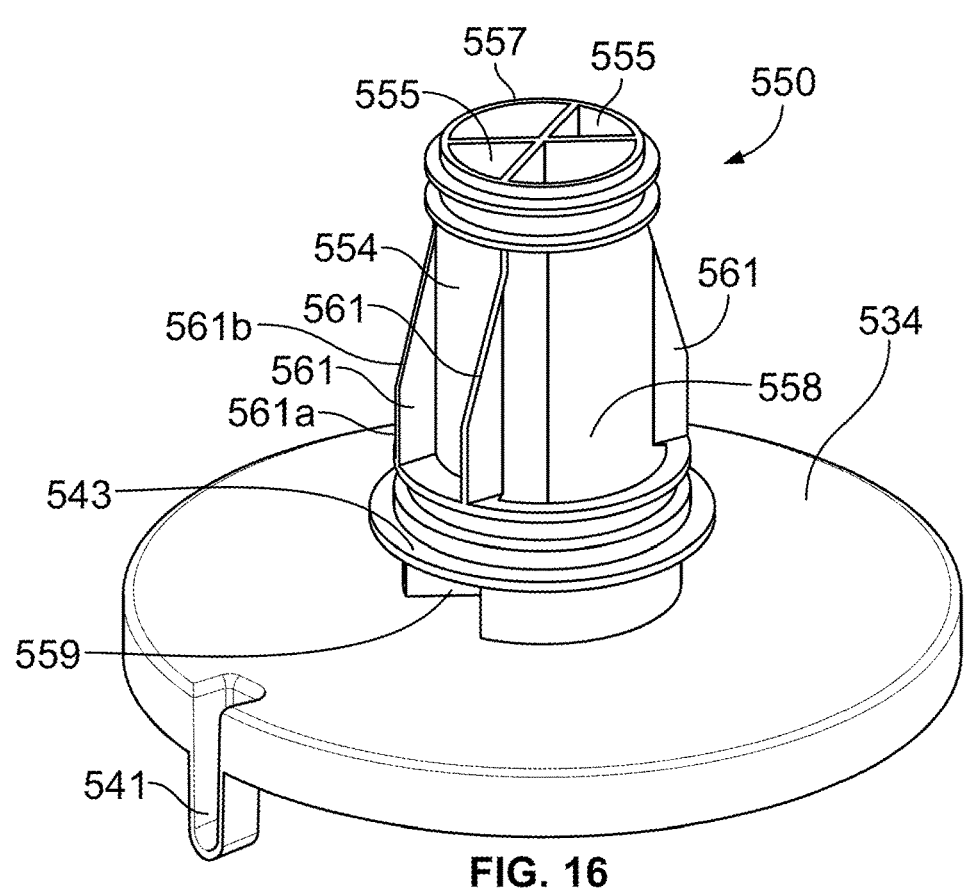
FIG. 16 is a bottom perspective view of an outlet assembly and an endplate included in the filter assembly of FIG. 12, according to an embodiment.

As shown in FIGS. 15-16, a protrusion 541 extends from proximate to a radial periphery of the endplate 534 axially upwards towards the filter element 530. The protrusion 541 may mate with a filter element slot defined in the filter media 532 (e.g., the filter element slot 131 described with respect to the filter element 130). The protrusion 541 and corresponding filter element slot 531 may provide a poke-yoke feature for ensuring proper alignment of the filter element 530 within the internal volume 505 so as to prevent non-genuine filter elements from being used in the filter assembly 500, and/or serve as a pleat separation feature to facilitate equal separation of pleats of the filter media 532.

The outlet assembly 550 is coupled to each of the first outlet 512 and the second outlet 514. The outlet assembly 550 is coupled to the endplate 534, for example, is integrally formed with the endplate 534. In other embodiments, the outlet assembly 550 may be a separate component coupled to endplate 534, for example via coupling members, being snap-fit, or being welded to the endplate 534. The outlet assembly 550 comprises a first flow path fluidly coupled to a clean side of the filter element 530, i.e., the central channel defined by the center tube 570 and the first outlet 512. The first flow path receives the filtered fuel from the clean side of the filter element 530 and communicates the filtered fuel to the first outlet 512. Moreover, the outlet assembly 550 also comprises a second flow path fluidly coupled to the internal volume 505 of the housing 501 and to the second outlet 514. The second flow path receives the water from the internal volume 505 and communicates the water through the second outlet 514 into the water reservoir 504. In some embodiments, at least a portion of the outlet assembly 550 that defines the first flow path and the second flow path is disposed through the second outlet 514.

As shown in FIGS. 13-16, the outlet assembly 550 includes a tube-like structure, a portion of which is disposed through the second outlet 514. The outlet assembly 550 includes an outer wall 554 that defines a flow channel therethrough. A set of inner walls 556 are disposed within the flow channel defined by the outer wall 554 and extend radially from a central axis of the outer wall 554 to an inner surface of the outer wall 554 such that the flow channel is divided into four flow paths, two forming the first flow path, and the remaining two forming the second flow path. In other embodiments, any number of inner walls 556 may be used to form any number of flow paths, with any combination of the flow paths being dedicated for the first flow path and the second flow path. The outer wall 554 and the set of inner walls 556 are partially disposed in the second outlet 514 such that a portion of the outer wall 554 extends into the internal volume 505 and a space for water to flow is provided between the endplate 534 and the upper portion base 507.

The first flow path is defined between a first portion of the outer wall 554 and the set of inner walls 556. For example, the outlet assembly 550 defines a filtered fuel inlet 552 in fluid communication with the central channel and configured to receive filtered fuel. The outer wall 554 defines a set of first outer wall openings 558 at locations of the outer wall 554 that are aligned with corresponding first outlets 512. An outlet assembly base 557 is disposed at an end of the outlet assembly 550 distal from the filter element 530, and oriented orthogonal to the outer wall 554.

An outlet assembly first sealing member 544 (e.g., an O-ring or gasket) is disposed between the outer wall 554 and the second outlet 514 at a location proximate to the filter element 530, and an outlet assembly second sealing member 546 (e.g., an O-ring or gasket) is disposed between the outlet assembly base 557 and the second outlet 514 at a lower end of the end of the outlet assembly 550 distal from the filter element 530. The outlet assembly first sealing member 544 and the outlet assembly second sealing member 546 may be structured to provide facial and/or radial sealing.

An outlet assembly protrusion 543 (e.g., a circumferential protrusion) protrudes radially outwards from the outer wall 554 at a location of the outer wall 554 that is axially upwards of the outlet assembly first sealing member 544. The outlet assembly protrusion 543 is structured to seat in a notch 511 (e.g., a circumferential notch) defined on an inner periphery of the upper portion base 507 when the outlet assembly is properly installed in the housing. For example, as the outlet assembly 550 is inserted into the second outlet 514, the outlet assembly protrusion 543 engages the notch 511 that stops further displacement of the outlet assembly 550 into the second outlet 514. In this manner, the outer assembly protrusion 543 and the notch 511 may facilitate proper positioning of the outlet assembly 550 within the second outlet 514.

The outlet assembly 550 may also include a plurality of arms 561 projecting radially from outlet surfaces of the outer wall 554, for example, from edges of the outer wall 554 towards the second outlet 514. At least a portion of each of the plurality of arms 561 may have a radial width corresponding to a radial distance between the outer walls 554 and an inner surface of the second outlet 514 such that outer surface of the portion of the arms 561 contacts an inner surface of the second outlet 514 so as to secure the outlet assembly 550 therewithin (e.g., via a friction fit). For example, as shown in FIG. 16, each of the plurality of arms 561 has an arm first portion 561a located proximate to the endplate 534, and an arm second portion 561b extending from the arm first portion 561a towards the outlet assembly base 557. The arm first portion 561a has a constant radial width that corresponds to a radial distance between the outer wall 554 and the inner surface of the second outlet 514. The arm second portion 561b tapers (e.g., is chamfered) inwards from the arm first portion 561a towards the outlet assembly base 557 such that the arm second portion 561b has a constantly reducing width. The tapered arm second portion 561b facilitates insertion of the outlet assembly 550 into the second outlet 514, and the arm first portion 561a may secure the outlet assembly 550 within the second outlet 514.

As shown in FIG. 14, the first flow path is defined from the filtered fuel inlet 552 and between the first portion of the outer wall 554 and the set of inner walls 556 to the first outer wall openings 558 that are in fluid communication with corresponding first outlets 512. The outlet assembly base 557 fluidly isolates the first flow path from second flow path and the section of the lower portion 501a that is in fluid communication with the water reservoir 504.

A second portion of the outer wall 554 proximate to the filter element 530 defines a set of second outer wall openings 559 (FIGS. 13 and 16) at a location that is axially and radially offset from the set of first outer wall openings 558 and is proximate to the filter element 530. The set of second outer wall openings 559 are in fluid communication with the internal volume 505. The second portion of the outer wall 554 and the set of inner walls 556 define the second flow path therebetween that is distinct from, and fluidly isolated from, the first flow path. The outlet assembly base 557 defines a set of water outlets 555 that are in fluid communication with the second flow path. As shown in FIGS. 12 and 13, separated water flows through the set of second outer wall openings 559 between the second portion of the outer wall 554 and the set of inner walls 556 through the set of water outlets 555 into the section of the lower portion 501a that is fluidly isolated from the internal volume 505 by the upper portion base 507, and therefrom into the water reservoir 504.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

The terms "coupled," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present application.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A filter assembly, comprising:
    a housing defining an internal volume, the housing comprising:
        an inlet for receiving fuel, a first outlet to allow filtered fuel to exit the internal volume, and a second outlet to allow water separated from the fuel to exit the internal volume;

a filter element disposed within the internal volume for filtering the fuel so as to provide the filtered fuel and separate the water from the fuel, wherein the filter element comprises:

a filter media, and an endplate coupled to an end of the filter media; and an outlet assembly coupled to the endplate, wherein the outlet assembly is fluidly coupled to each of the first outlet and the second outlet, the outlet assembly comprising:

an outer wall defining a flow channel therethrough; and a set of inner walls disposed within the flow channel and extending radially from a central axis of the outer wall to an inner surface of the outer wall such that the flow channel is divided into a plurality of flow paths, a first set of the plurality of flow paths forming a first flow path, and a second set of the plurality of flow paths forming a second flow path, wherein:

the first flow path is fluidly coupled to a clean side of the filter element and the first outlet so as to receive the filtered fuel from the clean side of the filter element and communicate the filtered fuel to the first outlet, and the second flow path is fluidly coupled to the internal volume of the housing and to the second outlet so as to receive the water from the internal volume and communicate the water through the second outlet.

2. The filter assembly of claim 1, wherein: the second outlet is axially aligned with a longitudinal axis of the filter assembly, and the first outlet is oriented orthogonal to the second outlet.

3. The filter assembly of claim 1, wherein at least a portion of the outlet assembly that defines the first flow path and the second flow path is disposed through the second outlet.

4. The filter assembly of claim 1, wherein the outer wall and the set of inner walls are partially disposed in the second outlet such that a portion of the outer wall extends into the internal volume defined by the housing.

5. The filter assembly of claim 1, wherein:

the filter element defines a central channel, and the outlet assembly defines a filtered fuel inlet in fluid communication with the central channel and the first flow path, the filtered fuel inlet configured to receive filtered fuel from the central channel.

6. The filter assembly of claim 1, wherein the outer wall defines a first outer wall opening at a location of the outer wall that is aligned with the corresponding first outlet.

7. The filter assembly of claim 1, wherein a portion of the outer wall proximate to the filter element defines a second outer wall opening at location that is axially and radially offset from the first outer wall opening proximate to the filter element, the second outer wall opening in fluid communication with the internal volume.

8. The filter assembly of claim 1, wherein the outlet assembly further comprises an outlet assembly first sealing member disposed between the outer wall and the second outlet at a location proximate to the filter element.

9. The filter assembly of claim 8, wherein the outlet assembly further comprises an outlet assembly second sealing member disposed between the outer wall and the second outlet at a lower end of the outlet assembly distal from the filter element.

10. The filter assembly of claim 8, wherein:

the housing comprises an upper portion defining an upper portion base, a notch being defined on an inner periphery of the upper portion base; and the outlet assembly further comprises an outlet assembly protrusion protruding radially outwards form the outer wall at a location that is a axially upwards of the outlet assembly first sealing member, the outlet assembly protrusion configured to seat in the notch when the outlet assembly is properly installed in the housing.

11. A filter element for filtering fuel and separating water from fuel, the filter element configured to be disposed within an internal volume of a housing and comprising:

a filter media;

an endplate coupled to an end of the filter media; and an outlet assembly coupled to a bottom surface of the endplate, the outlet assembly comprising:

an outer wall defining a flow channel therethrough, and a set of inner walls disposed within the flow channel and extending radially from a central axis of the outer wall to an inner surface of the outer wall such that the flow channel is divided into a plurality of flow paths, a first set of the plurality of flow paths forming a first flow path fluidly coupled to a clean side of the filter media and configured to be fluidly coupled to a first outlet of the housing so as to receive the filtered fuel from the clean side of the filter media and communicate the filtered fuel to the first outlet so as to allow the filtered fuel to exit the internal volume, and a second set of the plurality of flow paths forming a second flow path configured to be fluidly coupled to the internal volume of the housing and to a second outlet of the housing so as to receive the water from the internal volume and communicate the water through the second outlet so to allow the water separated from the fuel to exit the internal volume.

12. The filter element of claim 11, wherein the outer wall and the set of inner walls are configured to be partially disposed in the second outlet such that a portion of the outer wall extends into the internal volume defined by the housing when the filter element is installed in the housing.

13. The filter element of claim 11, wherein:

the filter media defines a central channel, and the outlet assembly defines a filtered fuel inlet in fluid communication with the central channel and the first flow path, the filtered fuel inlet configured to receive filtered fuel from the central channel.

14. The filter element of claim 11, wherein the outer wall defines a first outer wall opening at locations of the outer wall that is configured to align with the first outlet when the filter element is installed in the housing.

15. The filter element of claim 11, wherein a portion of the outer wall proximate to the filter element defines a second outer wall opening at a location that is axially and radially offset from the first outer wall opening proximate to the filter media, the second outer wall opening configured to be in fluid communication with the internal volume when the filter element is installed in the housing.

16. The filter element of claim 11, wherein the outlet assembly further comprises an outlet assembly first sealing member disposed on a radially outer surface of the outer wall at a location proximate to the filter media.

17. The filter element of claim 16, wherein the outlet assembly further comprises an outlet assembly second sealing member disposed on a radially outer surface of the outer wall at a lower end of the outlet assembly distal from the filter media.

18. The filter element of claim 11, wherein the outlet assembly further comprises:
a plurality of arms projecting radially outwards from outer surfaces of the outer wall, each of the plurality of arms comprising:
an arm first portion having a constant radial width, and
an arm second portion tapering radially inwards from the arm first portion towards an outlet assembly base that is located distal from the endplate, the arm first portion having a constantly reducing width from the arm first portion to the outlet assembly base.

19. The filter element of claim 17 wherein the first sealing member is spaced apart from the bottom surface of the end plate, and wherein the second sealing member is spaced below the first sealing member.

20. The filter element of claim 11 further comprising an outlet assembly protrusion protruding radially outwardly from the outer wall and configured to axially locate the outlet assembly relative to the housing.

21. The filter element of claim 11 wherein the end plate comprises an alignment protrusion extending axially upwardly from the end plate and engaged with a slot defined by the filter media.

\* \* \* \* \*